(12) United States Patent
Dittmer et al.

(10) Patent No.: US 7,793,903 B2
(45) Date of Patent: Sep. 14, 2010

(54) ARTICULATING ARM FOR FLAT PANEL DISPLAY

(75) Inventors: Jay Dittmer, Prior Lake, MN (US); Jeff Bremmon, Shakopee, MN (US)

(73) Assignee: Milestone AV Technologies LLC, Savage, MN (US)

( * ) Notice: Subject to any disclaimer, the term of this patent is extended or adjusted under 35 U.S.C. 154(b) by 739 days.

(21) Appl. No.: 11/447,226

(22) Filed: Jun. 5, 2006

(65) Prior Publication Data

US 2006/0284037 A1 Dec. 21, 2006

Related U.S. Application Data

(60) Provisional application No. 60/687,711, filed on Jun. 6, 2005.

(51) Int. Cl.
*E04G 3/00* (2006.01)
(52) U.S. Cl. .............. 248/276.1; 248/281.11; 248/917; 248/923; 361/679.06
(58) Field of Classification Search .......... 248/276.1, 248/282.1, 917, 919, 921, 923, 281.11, 283.1; 361/681, 679.21, 679.22, 679.06
See application file for complete search history.

(56) References Cited

U.S. PATENT DOCUMENTS

| 2,828,098 | A | 3/1958 | Lehmann |
|---|---|---|---|
| 3,574,340 | A | 4/1971 | Busche |
| 4,527,766 | A | 7/1985 | Krenz |
| 4,627,210 | A | 12/1986 | Beaulieu |
| 4,814,759 | A | 3/1989 | Gombrich et al. |
| 4,893,777 | A | 1/1990 | Gassaway |
| 4,960,256 | A | 10/1990 | Chihara et al. |
| 5,080,311 | A | 1/1992 | Engstrom |
| 5,165,644 | A | 11/1992 | Allen |
| 5,322,255 | A | 6/1994 | Garrett |
| 5,520,361 | A | 5/1996 | Lee |
| 5,537,290 | A | 7/1996 | Brown et al. |
| 5,553,820 | A | 9/1996 | Karten et al. |
| 5,713,549 | A | 2/1998 | Shieh |
| 5,715,138 | A | 2/1998 | Choi |
| 5,743,503 | A | 4/1998 | Voeller et al. |
| 5,772,174 | A | 6/1998 | Hirsch et al. |
| 5,842,672 | A | 12/1998 | Sweere et al. |
| 5,854,735 | A | 12/1998 | Cheng |
| 5,924,665 | A | 7/1999 | Sweere et al. |
| 5,941,493 | A | 8/1999 | Cheng |
| 5,995,179 | A | 11/1999 | Tamura et al. |
| 6,019,332 | A | 2/2000 | Sweere et al. |

(Continued)

OTHER PUBLICATIONS

Chief Manufacturing; Full Line Product Guide 2004; Jan. 2004; 68 pages; Savage, Minnesota.

*Primary Examiner*—Anita M King
(74) *Attorney, Agent, or Firm*—Patterson Thuente Christensen Pedersen, P.A.

(57) ABSTRACT

The instant mount with articulating arm(s) for mounting an appliance on a vertical structure is both vertically and horizontally adjustable by having a vertical adjustment mechanism and a horizontal adjustment mechanism. Once mounted, the appliance can be displaced away from the vertical structure or retracted toward the vertical structure. Well separated brackets used to mount the instant invention provide for contact points well spaced apart to reduce stress exerted on the vertical structure by the weights of the instant device and appliance.

9 Claims, 14 Drawing Sheets

U.S. PATENT DOCUMENTS

| | | |
|---|---|---|
| 6,021,720 A | 2/2000 | Boos et al. |
| 6,045,103 A | 4/2000 | Costa et al. |
| 6,098,952 A | 8/2000 | Tonn |
| 6,102,348 A | 8/2000 | O'Neill |
| 6,189,850 B1 | 2/2001 | Liao et al. |
| 6,340,146 B1 | 1/2002 | Tzeng |
| 6,347,776 B1 | 2/2002 | Huang |
| 6,354,549 B2 | 3/2002 | Sweere et al. |
| 6,361,012 B1 | 3/2002 | Chang |
| 6,378,830 B1 | 4/2002 | Lu |
| 6,394,403 B1 | 5/2002 | Hung |
| 6,402,109 B1 | 6/2002 | Dittmer |
| 6,416,027 B1 | 7/2002 | Hart |
| 6,418,010 B1 | 7/2002 | Sawyer |
| 6,453,409 B1 | 9/2002 | Nakamura |
| 6,478,275 B1 | 11/2002 | Huang |
| 6,484,987 B2 | 11/2002 | Weaver |
| 6,494,429 B2 | 12/2002 | Tajima |
| 6,543,734 B2 | 4/2003 | Yeh |
| 6,554,242 B2 | 4/2003 | Kim |
| 6,559,829 B1 | 5/2003 | Matsuo et al. |
| 6,560,094 B2 | 5/2003 | Schmidt |
| 6,575,419 B1 | 6/2003 | Masuda et al. |
| 6,585,203 B1 | 7/2003 | Euker |
| 6,592,090 B1 | 7/2003 | Li |
| 6,594,143 B2 | 7/2003 | Yano et al. |
| 6,604,722 B1 * | 8/2003 | Tan ......................... 248/276.1 |
| 6,752,363 B2 | 6/2004 | Boele |
| 6,783,105 B2 | 8/2004 | Oddsen, Jr. |
| 6,796,540 B1 | 9/2004 | Manceor |
| 6,886,701 B2 | 5/2005 | Hong et al. |
| 6,905,101 B1 | 6/2005 | Dittmer |
| 7,048,242 B2 * | 5/2006 | Oddsen, Jr. ............. 248/280.11 |
| 7,100,880 B2 * | 9/2006 | Oddsen, Jr. ............. 248/278.1 |
| D540,332 S * | 4/2007 | Dittmer et al. ............. D14/452 |
| 7,395,996 B2 * | 7/2008 | Dittmer ................... 248/291.1 |
| 7,398,950 B2 * | 7/2008 | Hung ..................... 248/276.1 |
| 2004/0178312 A1 | 9/2004 | Parsons |

* cited by examiner

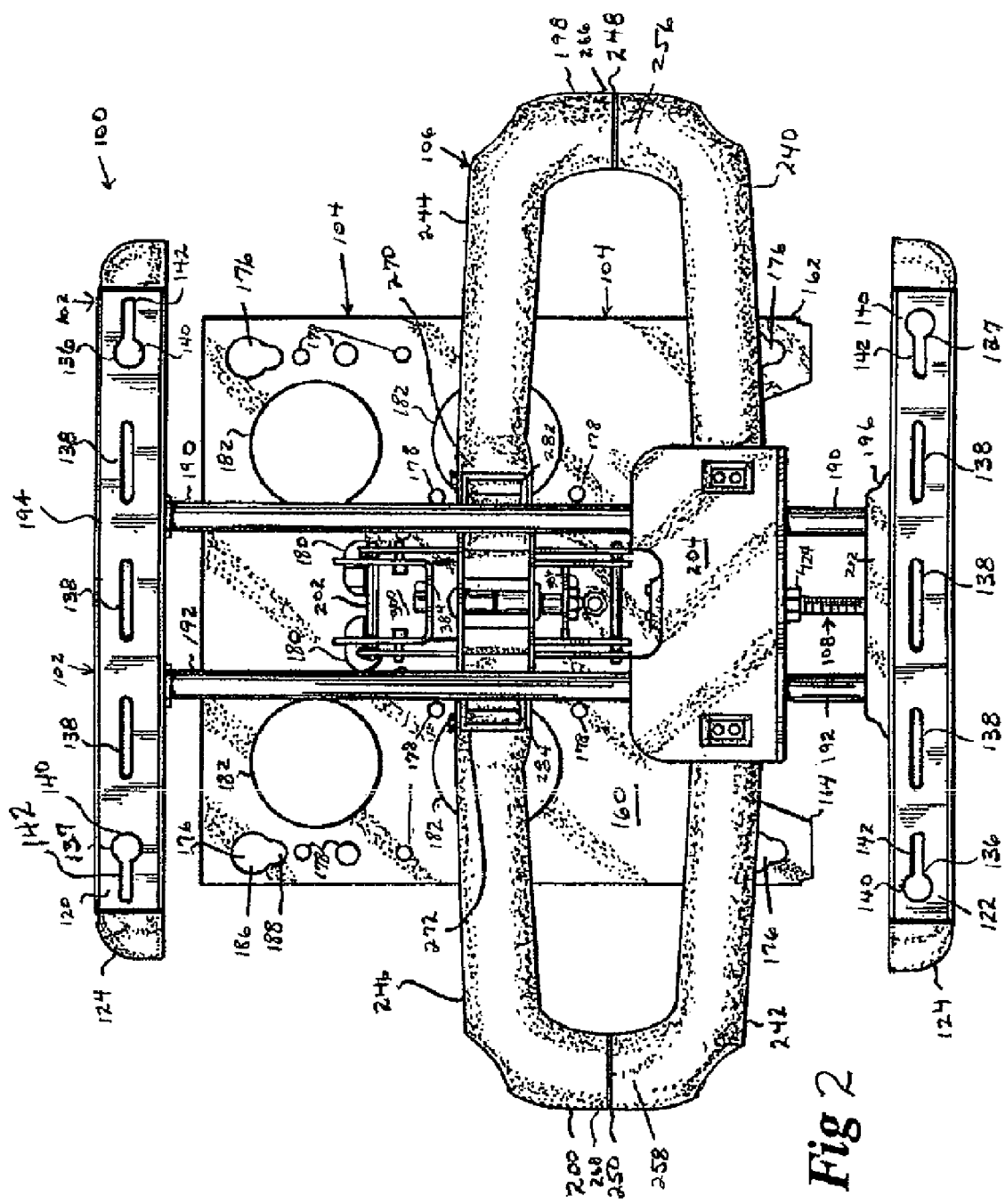

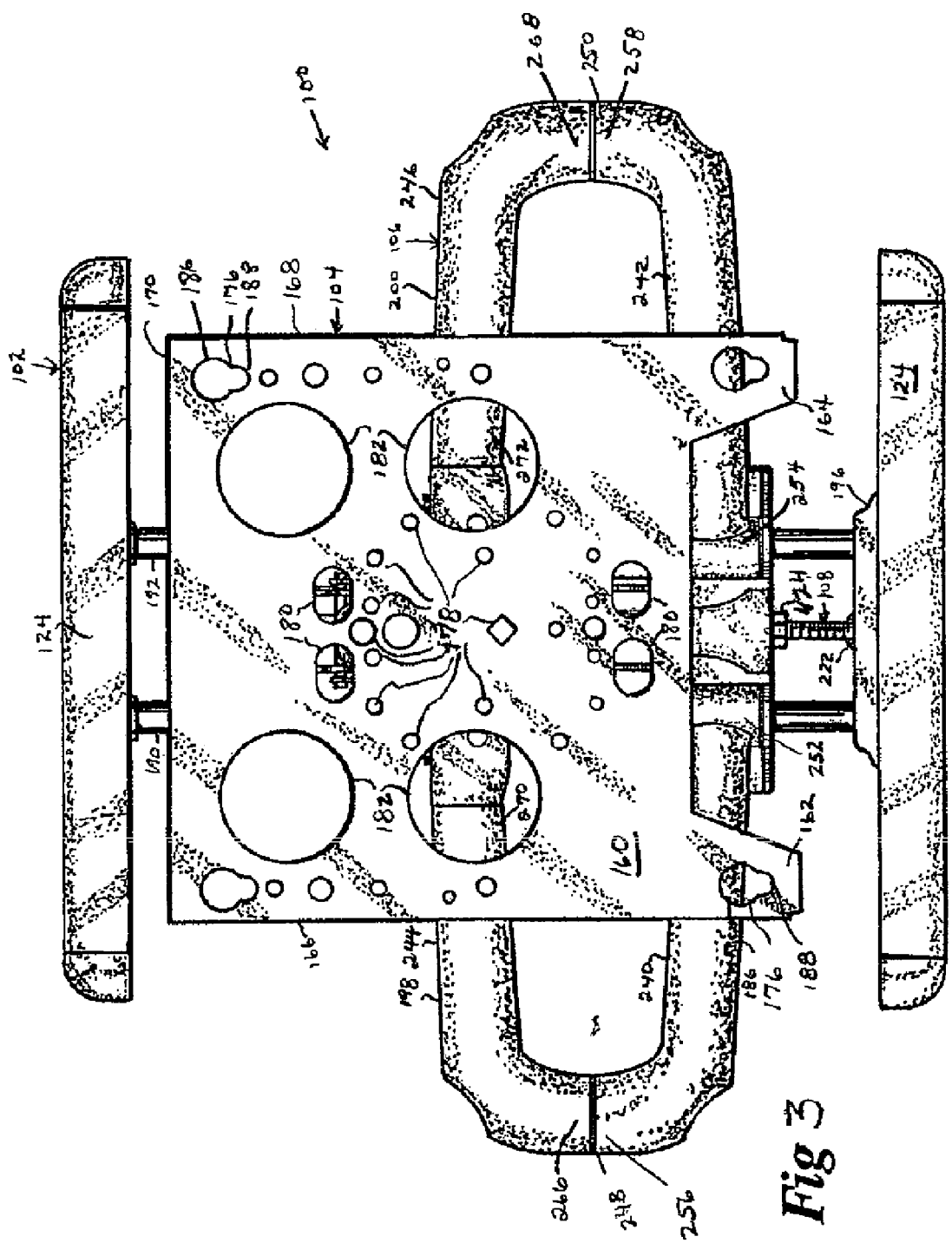

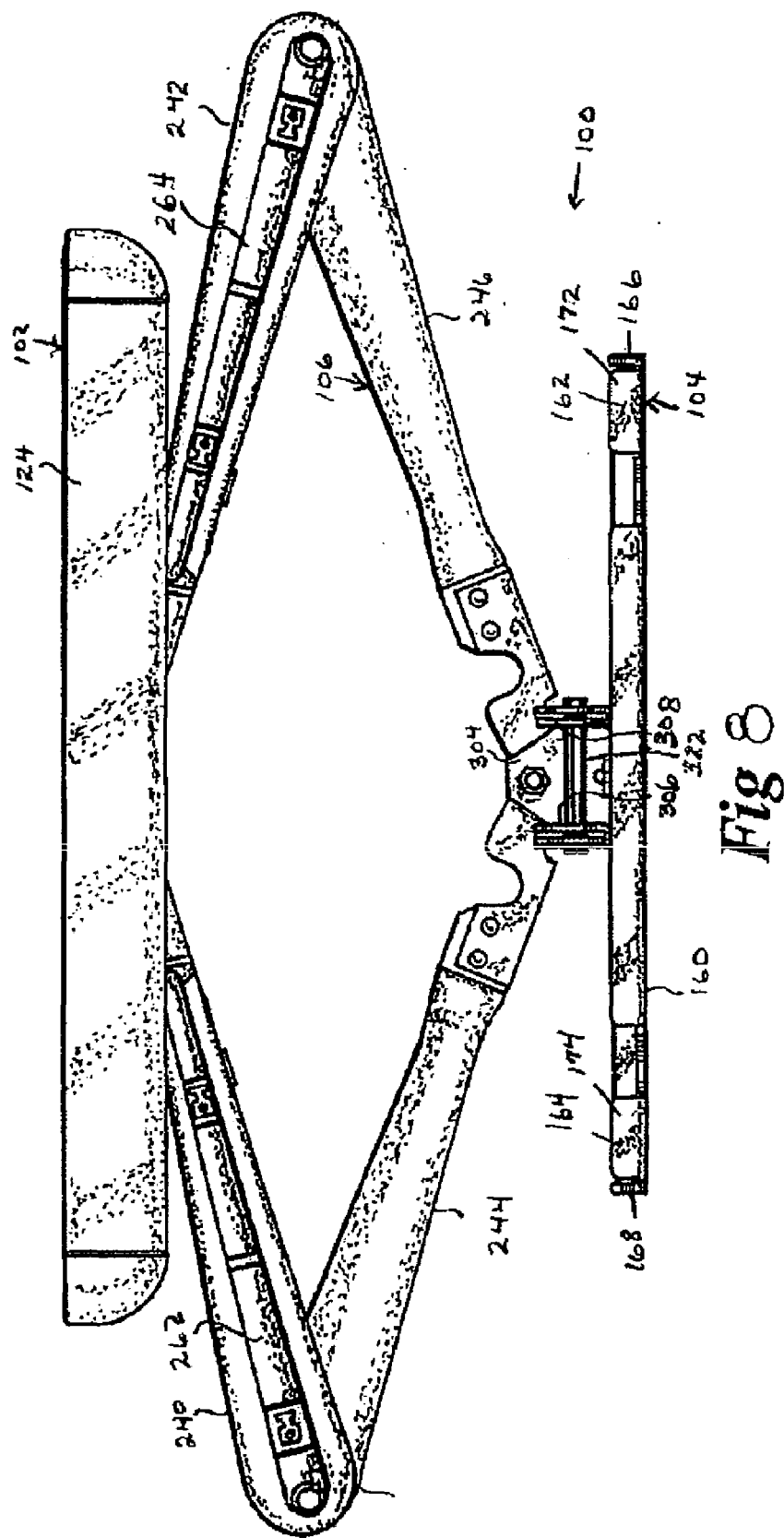

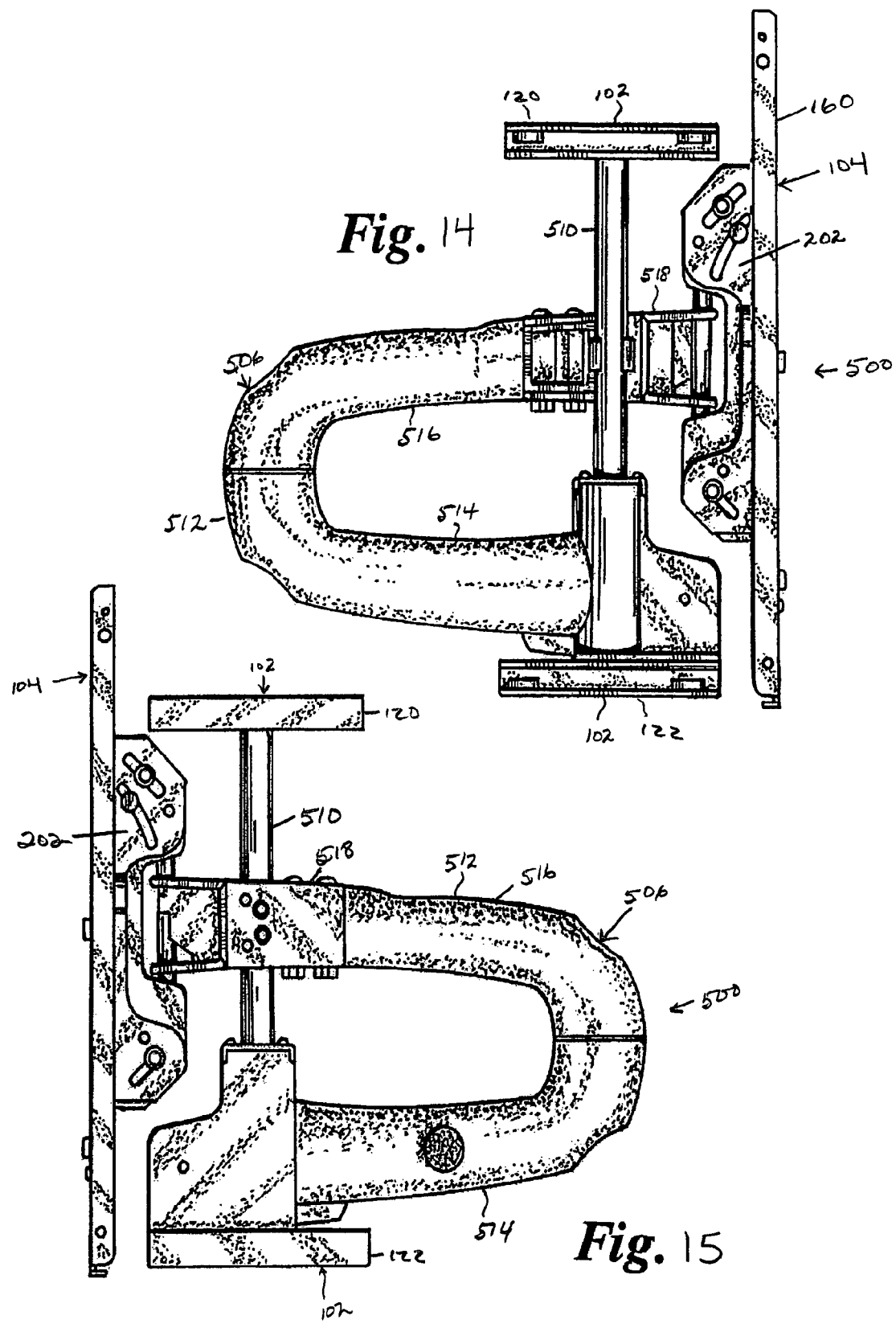

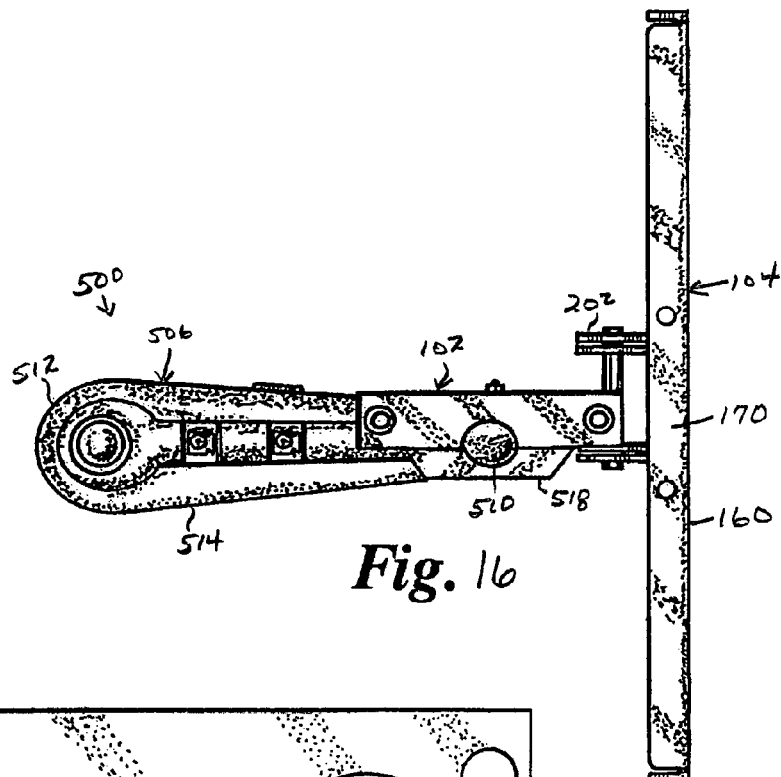
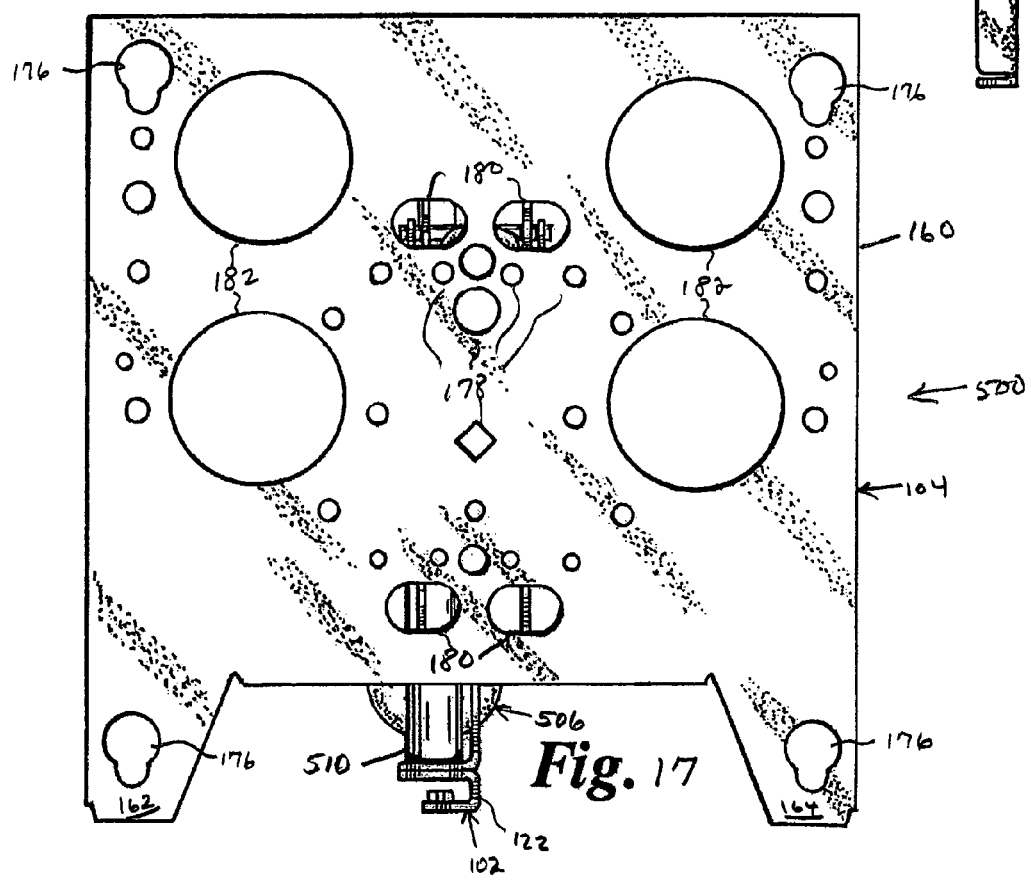

ARTICULATING ARM FOR FLAT PANEL DISPLAY

CROSS-REFERENCES TO RELATED APPLICATIONS

This application claims priority under 35 U.S.C. §119 (e) to U.S. Provisional Application No. 60/687,711, filed Jun. 6, 2005, each hereby incorporated by reference.

BACKGROUND OF THE INVENTION

1. Field of the Invention

This invention relates to implements for mounting appliances and, in particular, this invention relates to devices for mounting appliances such as televisions and flat panel displays to generally vertical structures such as walls.

2. Background

Electronic appliances, such as televisions and flat panel electronic displays are generally heavy, hence, cumbersome to mount to vertical structures such as walls. Brackets and other structures used for mounting these appliances must, therefore, be capable of securing these appliances to vertical structures to prevent them from being dislodged and subsequently damaged and from damaging the vertical structures due to their weight. It is often desirable to have the capability of extending or retracting appliances secured to vertical structures such as walls so as to more easily view images depicted thereon, yet to retract the appliances proximate the vertical structure as desired. Additionally, it is often desirable to have the capability of horizontally and vertically adjusting the position of the appliance during, and after, the appliance is secured to the vertical structure.

SUMMARY

One embodiment of the panel wall mount of this invention provides for a wall mount assembly having well separated upper and lower brackets. One advantage of the foregoing feature is that the well separated upper and lower brackets spread the load imparted by the weight of the panel wall mount of this invention and attached appliance. Another advantage of the foregoing feature is that a wall, or other structure to which the wall mount assembly of this invention is attached, is less likely to become damaged by forces exerted by the weight of the panel wall mount of this invention and attached appliance. Another advantage of the foregoing feature is that the relatively small surface area and well spaced apart location of the brackets enables wiring to exit from the wall structure at virtually any point defined the flat panel electronic display without interfering with the attachment of the mounting brackets to the wall and without apertures or other relief structures in the mounting brackets.

It is another feature of this invention that relatively narrow slots and slots having larger, generally circular portions are provided in the attachment of brackets. It is one advantage of the foregoing feature that the panel wall mount of this invention can be quickly and efficiently attached to a desired structure. It is another advantage of the foregoing feature that the panel wall mount of this invention can be easily horizontally adjusted to a substantially exact, desired location, regardless of the location of support members, such as studs.

It is another feature of this invention to provide a height adjustment mechanism. It is an advantage of the foregoing feature that the height of attached appliances can be quickly and easily adjusted to a substantially exact vertical location. In combination with the horizontal adjustment feature, this feature enables substantially exact positional adjustment of the flat panel electronic display, such as within a shadow box, regardless of the location of support members.

It is another feature that the adjustable arms of the panel wall mount of this invention define generally longitudinal channels therein for receiving cables. It is an advantage of the foregoing feature that cables are quickly and easily routed and a fixed to the arms, so as to be secure from being snagged or pulled when the panel wall mount of this invention is being extended or retracted. The arms of the panel wall mount devices may have smoothed rounded surfaces for further preventing snagging of the cables. In two arm embodiments, power cables may be routed separately from signal cables to prevent undesired interference.

These and other objects, features, and advantages of this invention will become apparent from the description which follows, when considered in view of the accompanying drawings.

BRIEF DESCRIPTION OF THE DRAWINGS

FIG. 2 is a rear view of the panel display of FIG. 1;

FIG. 3 is a front view of the panel display of FIG. 1;

FIG. 8 is a bottom view of the panel display of FIG. 1;

FIG. 14 is a right side view of the panel display of FIG. 12;

FIG. 15 is a left side view of the panel display of FIG. 12;

FIG. 16 is a top view of the panel display of FIG. 12;

FIG. 17 is a front view of the panel display of FIG. 12;

It is understood that the above-described figures are only illustrative of the present invention and are not contemplated to limit the scope thereof.

DESCRIPTION

Each of the features and methods disclosed herein may be utilized separately or in conjunction with other features and methods to provide improved devices of this invention and methods for making the same. This detailed description is merely intended to teach a person of skill in the art further details for practicing preferred aspects of the present teachings and is not intended to limit the scope of the invention. Therefore, combinations of features and methods disclosed in the following detailed description may not be necessary to practice the invention in the broadest sense, and are instead taught merely to particularly describe representative and preferred embodiments of the invention.

Figure 1:
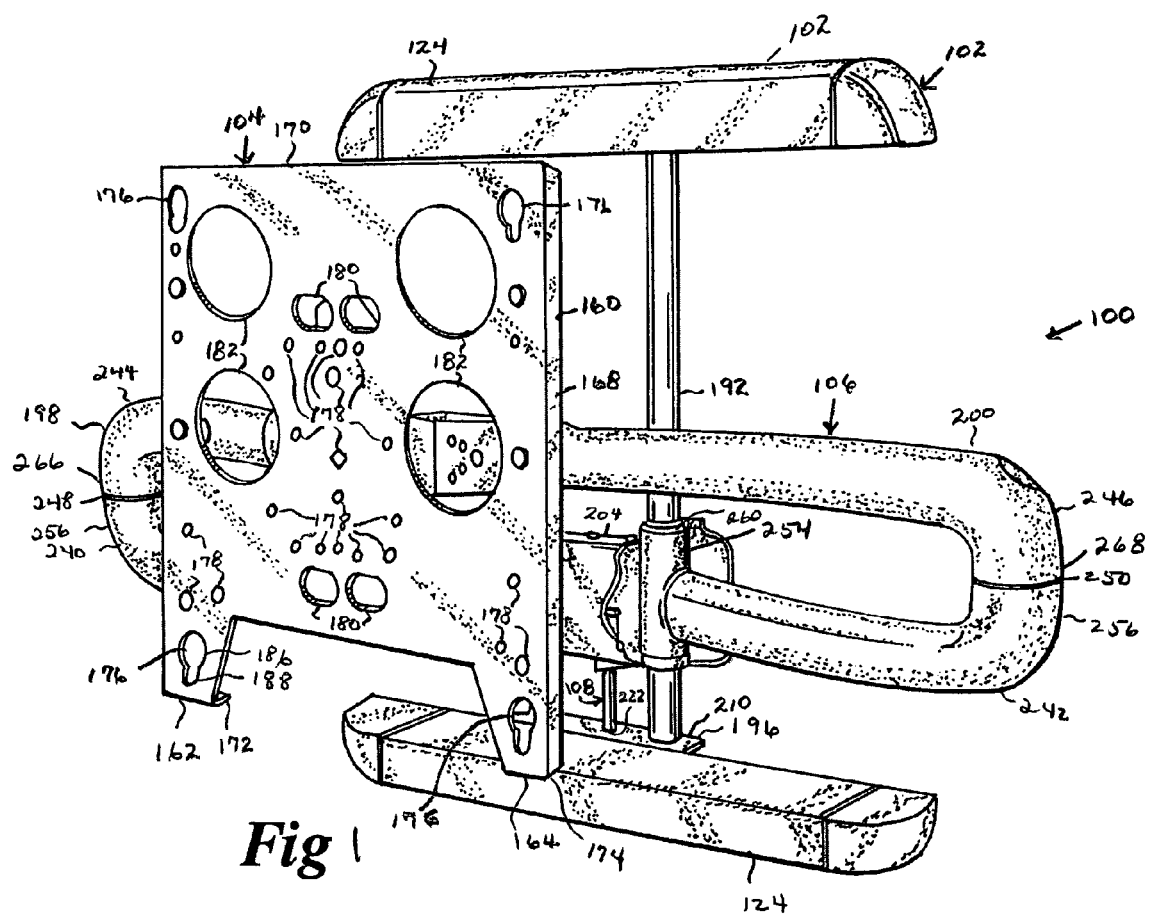
FIG. 1 is a perspective view of one embodiment of the panel display of this invention.

As shown in FIGS. 1, 2, and 3, one embodiment of the panel wall mount of this invention is depicted generally at 100 and includes a wall mount assembly 102, an appliance mounting assembly such as a panel mount assembly 104, an arm assembly 106, and a height adjusting mechanism 108.

The wall mount assembly, in turn, has a first (upper) bracket 120, a second (lower) bracket 122, and covers 124 disposable over the first and second brackets 120 and 122. In the embodiment depicted, the first and second brackets 120 and 122 are identical or substantially similar. When mounted on the wall mount assembly of this invention, the second bracket 122 is in an inverted relation with respect to the first bracket 120. Therefore, while the upper bracket 120 is described, corresponding features of the lower bracket 122 are indicated by identical numerals.

Figure 4:
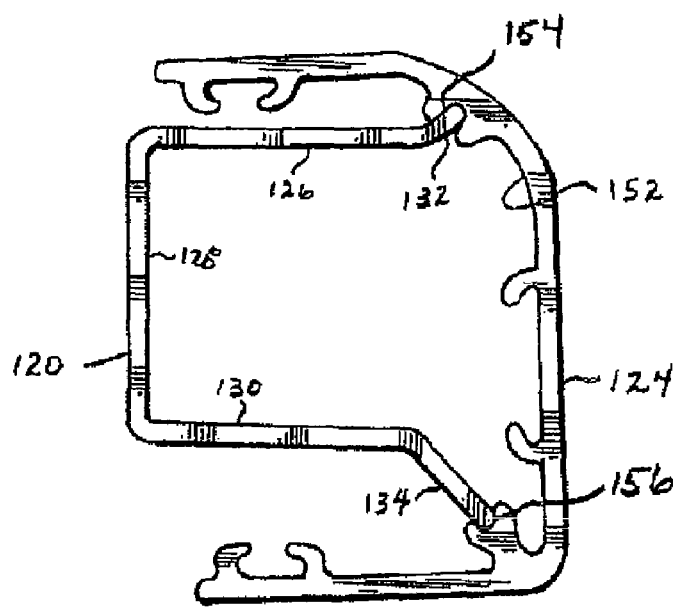
FIG. 4 is a sectional view of a mounting bracket of the panel display of FIG. 1.
Figure 5:
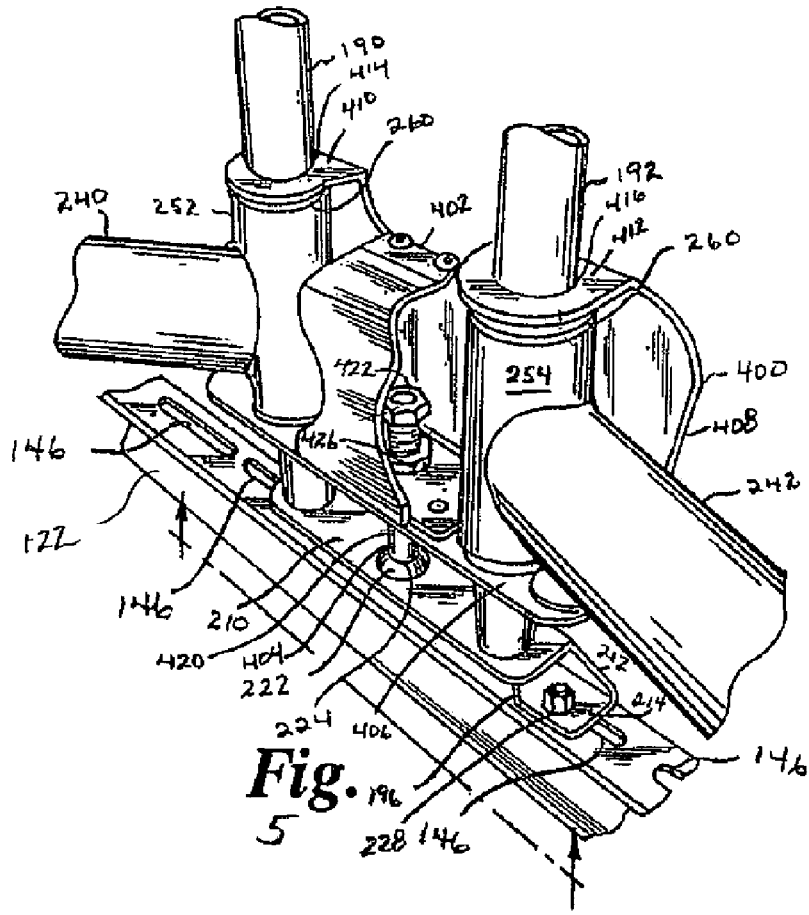
FIG. 5 is a perspective view of a portion of the arm assembly and height adjusting mechanism of the panel display of FIG. 1.
Figure 6:
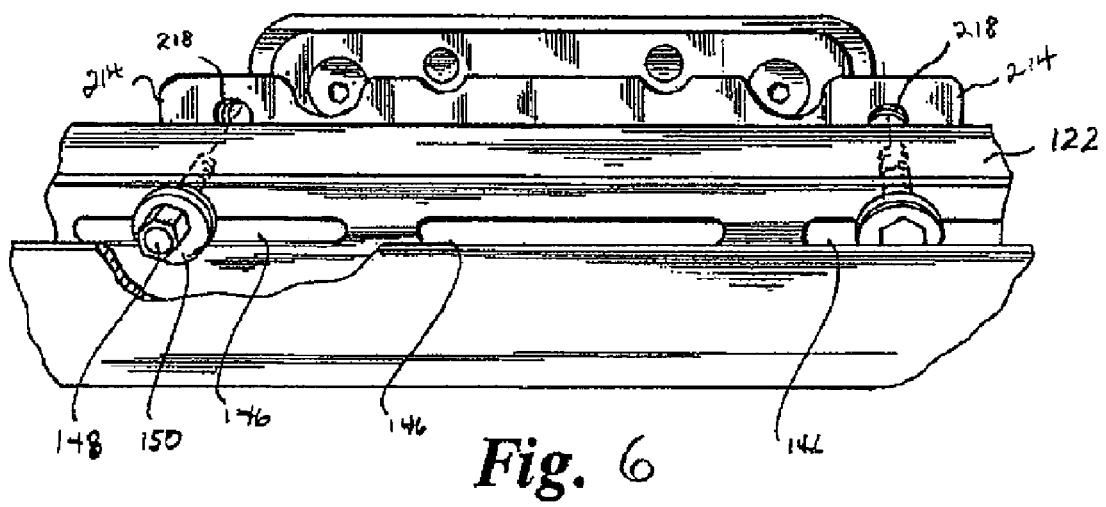
FIG. 6 is a partial upper view of the mounting bracket of the panel display of FIG. 1.

Referring to FIGS. 2 and 4, the first and second brackets 120 and 122 have a generally U-shaped cross-section with unitarily, or otherwise integrally, joined generally orthogonal upper, vertical, and lower plates 126, 128, and 130 and with lips 132 and 134 extending from the upper and lower plates 126 and 130, respectively. As shown, the lip 132 curves upwardly from plate 126 and the lip 134 bends downwardly from plate 130. In the embodiment shown in FIGS. 1 and 2, the vertical plate 128 has a pair of terminal keyholes 136 and 137 and at least one, e.g., three, first slots 138. The keyholes 136 and 137 are generally mirror images of each other and have access portions 140 opening into second slots 142. The access portions 140 are generally circular and have a larger vertical dimension than the slots 142. However, the person of ordinary skill in the art will readily see that one or more of the keyholes 136 and 137 may be inverted in another embodiment. The second slots 142 and the first slots 138 may be generally uniform in vertical dimension, horizontally aligned, and extend generally from side-to-side. The upper and lower plates 126 and 130 may have at least one, e.g., five third slots 146 as seen in FIGS. 5 and 6. In the embodiment depicted in FIGS. 5 and 6, the slots 146 are generally uniform and linearly extend from side to side. Connectors, such as bolts 148 and washers 150 may be used to attach the first and second brackets 120 and 122 to the remainder of the device of this invention, as is more fully described below.

The keyholes 136, 137 and first slots 138 may be used for mounting the instant panel wall mount to a surface, such as a vertical wall surface, wherein connectors with heads (not shown) may be utilized. The connector heads may have a larger radius, or other cross-dimension, than the vertical dimension of the first slot 138 or the second portion 142 of the keyhole 136 and be dimensioned so as to be accommodated in the access portions 140. Where one of the keyholes 136 is inverted (as described above), the connectors, the heads thereof accommodated by the first portions 140 of the keyholes 136, can be partially installed on the vertical surface. Then, installation of the instant panel wall mount is continued by being pressing it against the wall, simultaneously aligning the first portions 140 of the keyholes 136 with the connector heads, then sliding it horizontally until the connectors are disposed within and held in place by the slots 142, which have smaller vertical dimensions than the connector head cross-dimensions. Installation is completed by tightening the connectors until the heads thereof are snug against the vertical plates 128.

The position of the instant panel wall mount may be horizontally adjusted by selecting pairs of the slots 146 for attachment using the bolts 148 or, maintaining the bolts 148 in a pair of slots 146, sliding the panel wall mount of this invention horizontally to a desired position, then snugly retightening the bolts 148. Referring again to FIG. 4, interior surfaces 152 of the covers 124 may define, e.g., generally axial first and second slots 154 and 156. The slots 154 and 156 may be dimensioned and positioned to accommodate the upper and lower lips 132, 134 of the brackets 120, 122 to thereby secure the covers 124 over the brackets 120, 122 when desired, e.g., to hide the brackets 120, 122 from view when the instant panel wall mount is mounted to a surface such as a wall. The spaced apart location of the brackets 120 and 122 allow the instant panels display mounted to a wall to minimize the load exerted on the wall by the instant panel display and mounted appliance. Moreover, if the plurality of slots is present, the instant display can be horizontally positioned regardless of the location of structural elements such as studs.

Figure 9:
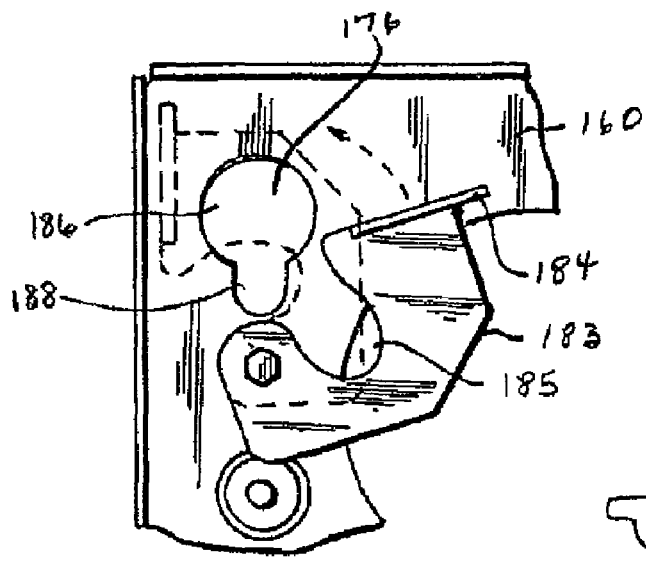
FIG. 9 is a partial view of one embodiment of a retaining mechanism for the panel display of this invention.

Referring to FIGS. 1, 2, 3, 7, and 8, the exemplary panel mount assembly 104 has a plate 160 with first and second lower extensions 162 and 164 and is rimmed by lateral lips 166 and 168, an upper lip 170, and lower lips 172 and 174. A plurality, e.g., four keyholes (slots) 176 and other pluralities of respective first, second, and third orifices 178, 180, and 182 are defined in the plate 160. A retainer 183 as depicted in FIG. 9 may optionally be pivotally mounted to the plate 160 and may have a handle portion 184 and define a cutout 185. The keyholes 176 have upper access portions 186 and lower notch (slot) portions 188. In this embodiment, the upper access portions 186 are generally circular and open into the lower notch portions 188. The access portions 186 have larger horizontal dimensions (diameters) then the horizontal dimensions of the notch portions 188. The keyholes 136, 137 and 176 may be advantageously utilized with fastening buttons (not shown) attached to items, such as flat panel displays, to be mounted on the plate 160. Suitable embodiments of the keyholes 136, 137 and 176 and fastening buttons are disclosed and described in U.S. patent application Ser. No. 10/821,395 and U.S. Pat. No. 6,402,109, hereby incorporated by reference. In the embodiment depicted, the retainer 183 is pivotally positioned so that the cutout pivots over notch 188 when the retainer 183 is in a closed position to thereby further secure a button already secured within the notch 188. The orifices 178 are depicted as being generally circular or diamond-shaped, the orifices 180 are shown as being generally elliptical, and the orifices 182 as being generally circular. However, a person of ordinary skill in the art will readily recognize that other geometric shapes, e.g., square, hexagonal, or the like, may be suitable for other embodiments. The orifices 178 are positioned as desired on the plate 160, so as to be available for mounting panels, or the like, on the wall mount of this invention, optionally in combination with the slots 176. Alternatively, the orifices 178, as well as the orifices 180 and 182, can be used to accommodate cables and wires extending from the item mounted to the plate 160.

As depicted in FIGS. 1, 2, 3, 5, 7, and 10, the arm assembly 106 of the instant invention includes first and second vertical members 190 and 192, respective first upper and second lower mounting brackets 194 and 196 (upper bracket 194 optional and not shown), first and second arms 198 and 200, a panel plate connecting assembly 202, and a vertical member connecting assembly 204. The vertical members 190 and 192 are generally cylindrical in the embodiment depicted, thereby being circular in cross section. However, a person of ordinary skill in the art will recognize that other cross-sectional geometries, e.g., elliptical, square, hexagonal, octagonal, or the like, may be suitable for other embodiments.

Respective upper and lower mounting brackets 194 and 196 are substantially identical in this embodiment. However, the lower mounting bracket 196 is mounted in an inverse orientation with respect to the upper bracket 194 in this embodiment. Because of this similarity, the lower bracket 196 will be described with the understanding that the description of the lower bracket 196 will apply to the upper bracket 194, corresponding elements being indicated by identical numerals. As best seen from FIGS. 5 and 6, the depicted embodiment of the lower bracket 196 has unitary, or otherwise integral, orthogonal upper, vertical, and lower plates 210, 212, and 214. Threaded orifices 218 are defined in the upper plate 210. These threaded orifices 218 accommodate the bolts 148 when the upper and lower brackets 194 and 196 are attached to the respective upper and lower wall mounting brackets 120 and 122. In addition to, or in place of, the threads present in the orifices 218, a person of ordinary skill will readily recognize that nuts, lock washers, and the like may be utilized to secure the bolts 148 in place. Additionally, a person of ordinary skill the art will recognize that the upper and lower brackets 194 and 196 may be attached to the wall brackets 120 and 122 using other connectors, e.g., rivets, welds, and functionally equivalent embodiments thereof A generally circular raised portion 222 defining an orifice 224 is defined in the upper plate 210 in the embodiment depicted. The functionalities of the raised portion 222 and orifice 224 are discussed below. Also defined in the upper plate 210 are a pair of orifices (not shown) disposed generally outboard the raised portion 222. The orifices accommodate a connector operably utilized to attach the vertical members 190 and 192 to the mounting brackets 194 and 196, optionally using spacers (not shown). A pair of apertures 228 are defined proximate each outboard edge of the lower plate 214. The brackets 194 and 196 are attached to the brackets 120 and 122 by securing connectors through the slots 146 and apertures 228. In addition to being horizontally positioned when being installed on a surface such as a wall, the instant device may be further horizontally positioned by selecting pairs of the slots 146 for use with the apertures 228 when the brackets 194, 196 are attached to the brackets 120, 122.

As shown in FIGS. 2, 3, and 5, the first and second arms 198 and 200 include respective proximal arm members 240 and 242 and distal arm members 244 and 246, the proximal and distal arm members pivotally articulated at the joints 248 and 250, respectively. The proximal arm members 240, 242, in turn, may include respective first ends 252 and 254 and second ends 256 and 258. In the embodiment depicted, the first ends 252, 254 are generally cylindrical and extend generally transversely, e.g., perpendicularly, to adjacent portions of the proximal arm members 240, 242. When operationally assembled, the first ends 252, 254 may accommodate a sleeve/spacer 260. The sleeve/spacer 260, in turn, accommodates the first and second vertical members 190, 192 so that the proximal arm members 240 and 242 can be horizontally pivoted. The second ends 256, 258 are pivotally articulated to respective distal arm members 244 and 246 at joints 248 and 250, such that the distal arm members 244, 246 horizontally pivot from the joints 248, 250, respectively. Respective slots 262 and 264 are axially defined in lower portions of the proximal arm members 240 and 242 as seen in FIG. 8.

Figure 7:
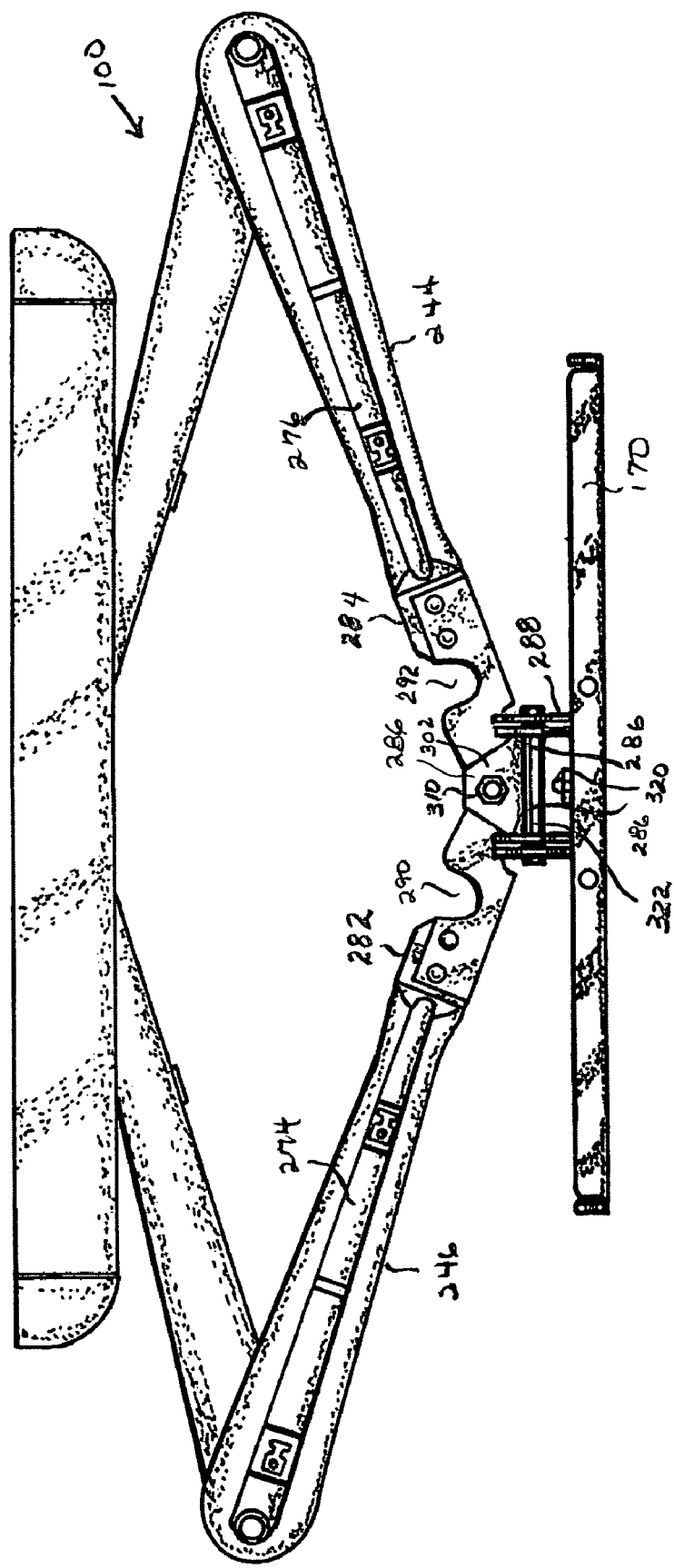
FIG. 7 is a top view of the panel display of FIG. 1.
Figure 10:
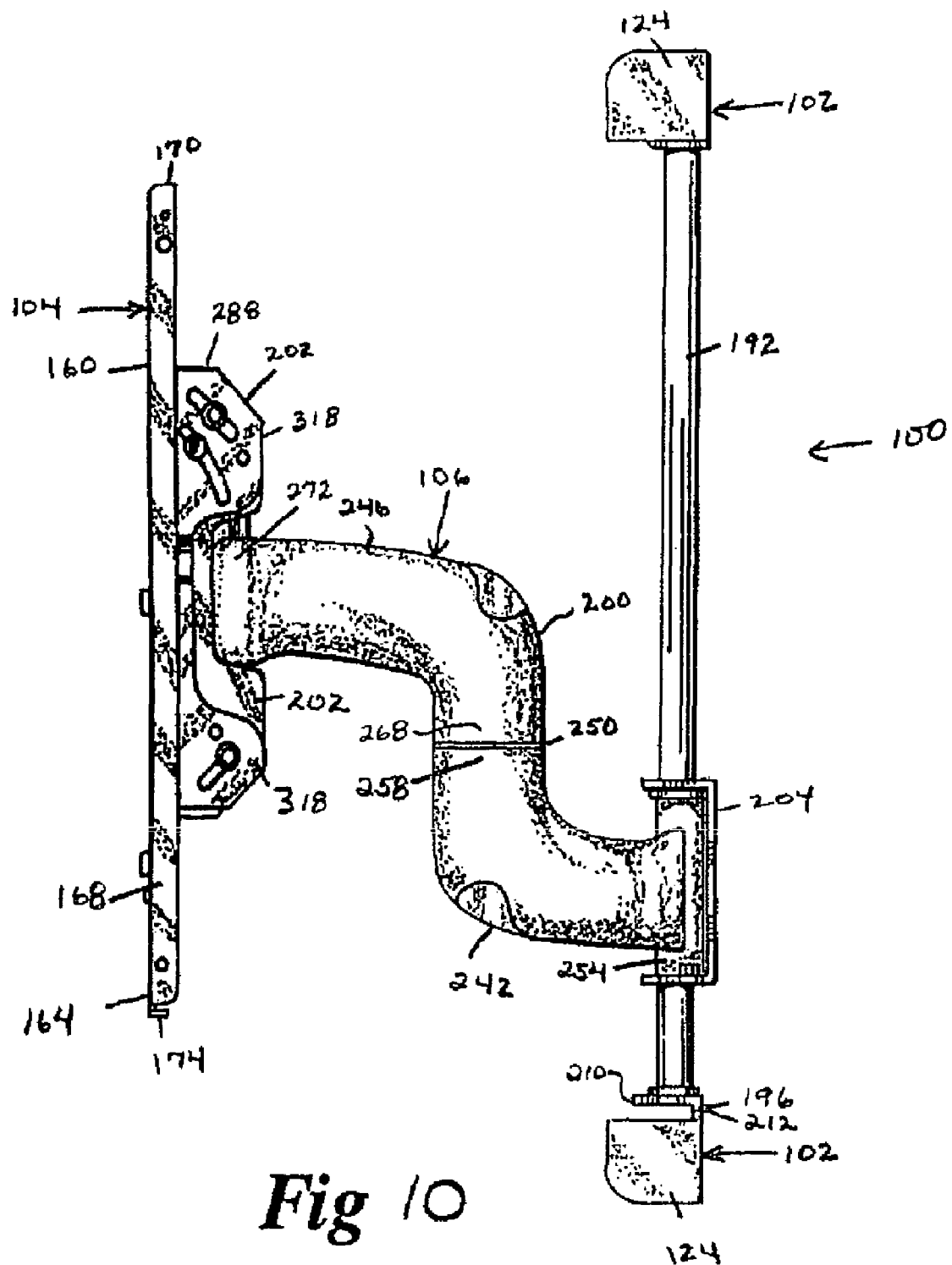
FIG. 10 is a side view of the panel display of FIG. 1.
Figure 11:
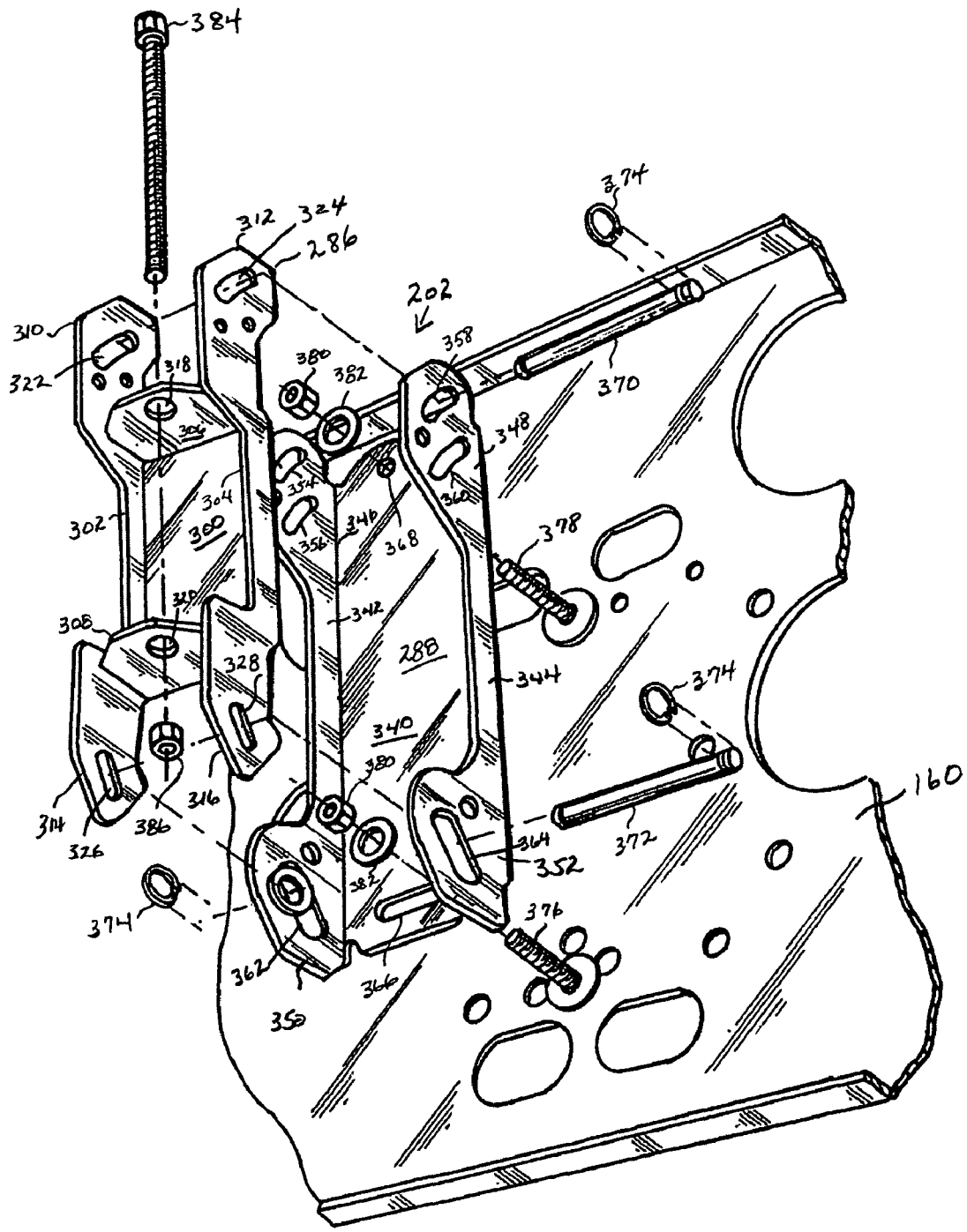
FIG. 11 is an exploded view of the panel plate connecting assembly of the panel display of this invention.
Figure 12:
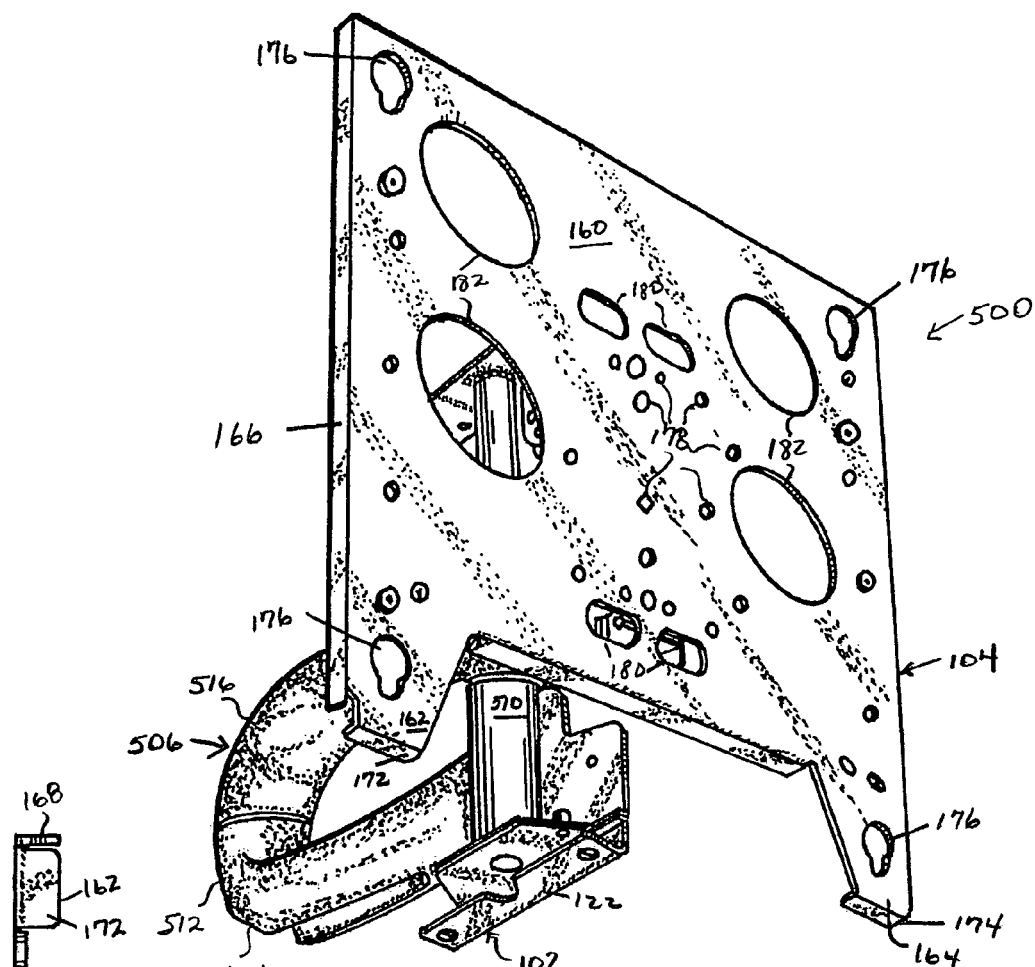
FIG. 12 is a perspective view of another embodiment of the panel display of this invention.
Figure 13:
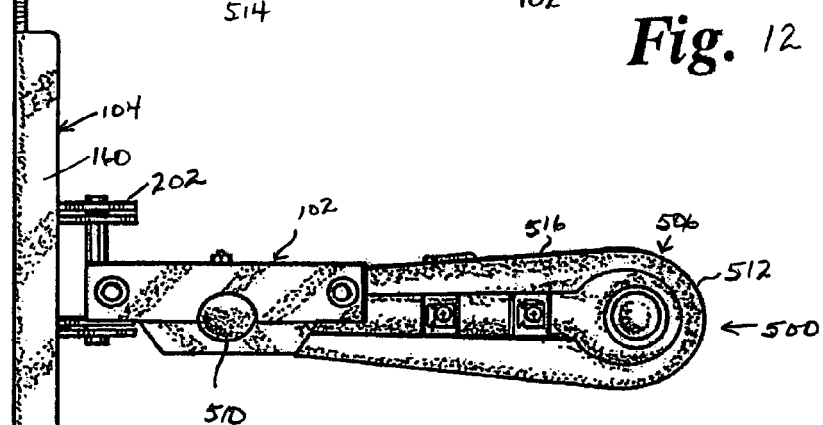
FIG. 13 is a bottom view of the panel display of FIG. 12.
Figure 18:
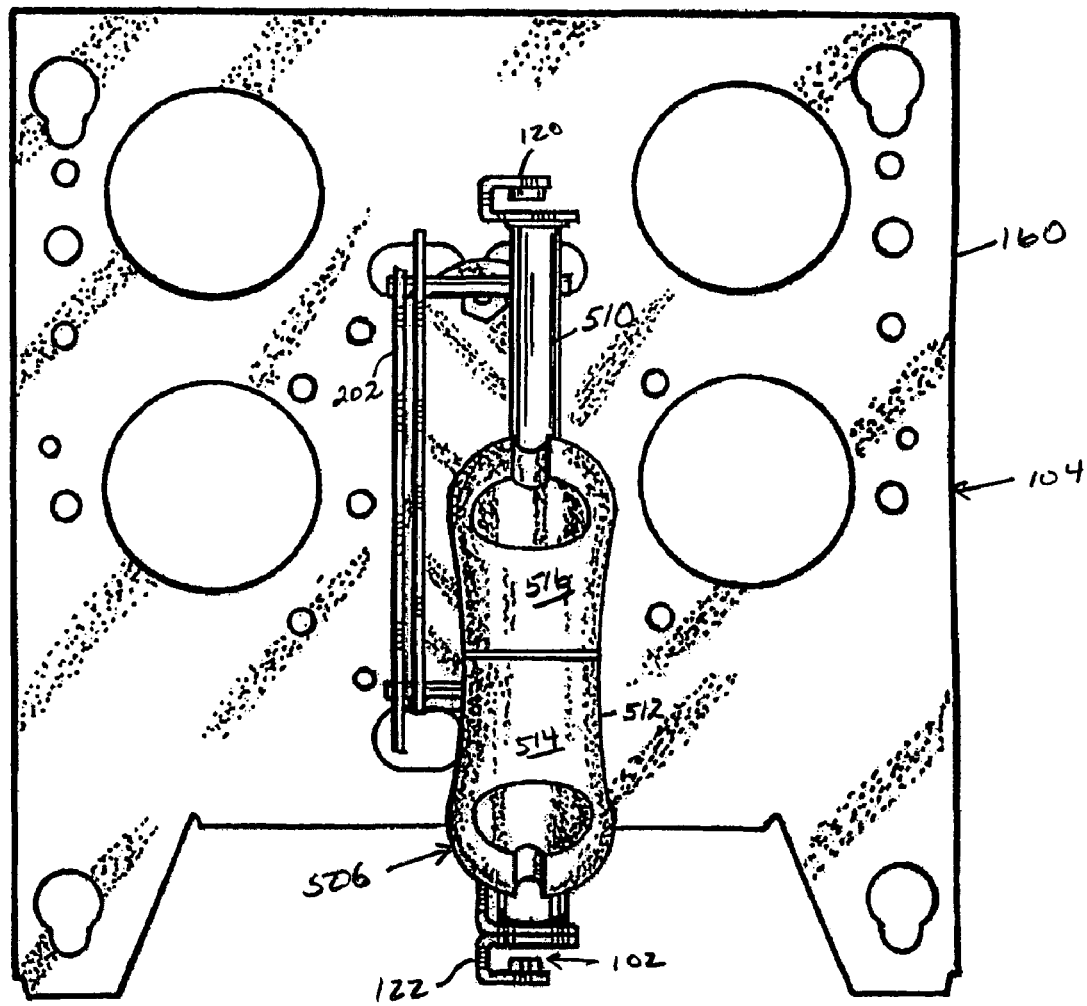
FIG. 18 is a rear view of the panel display of FIG. 12.
Figure 19:
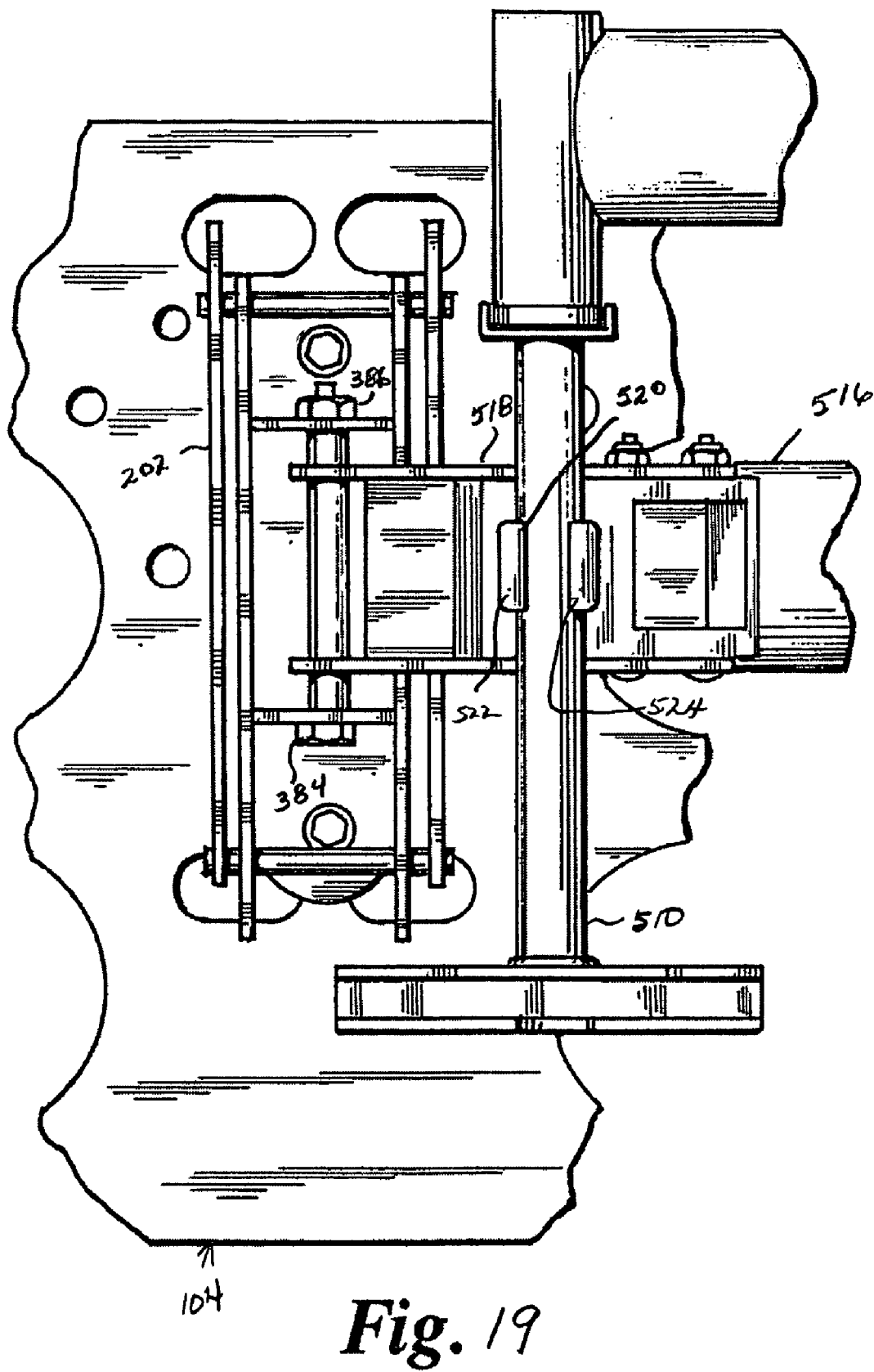
FIG. 19 is a fragmentary view depicting the arm bracket and panel plate connecting assembly of the panel display of FIG. 12.

The distal arm members 244, 246 may include respective first ends 266 and 268 and second ends 270 and 272. The first ends adjoin the joints 248, 250, respectively. The second ends 270 and 272 pivotally connect to the panel plate connecting assembly 202 as more fully described below. Upper portions of the distal arm members 244, 246 may axially define respective slots 274 and 276 as seen in FIG. 7.

The panel plate connecting assembly 202 of this embodiment may include arm brackets 282 and 284, an inner bracket 286, and an outer bracket 288. At first ends thereof, the arm brackets 282, 284 are connected to the distal arm members 244, 246. In cross section, the arm brackets 282, 284 are generally U-shaped, defining slots 290 and 292, the slots 290, 292 being dimensioned and positioned on the brackets 282, 284 such that the first and second vertical members 190, 192 are disposed within the slots 290, 292 when the panel wall mount 100 is in the closed position depicted in FIGS. 2 and 3. The other ends of the brackets 282, 284 define respective generally circular bores (not shown).

The inner bracket 286 may include a plate 300 bounded by lateral sides 302 and 304 and vertical sides 306 and 308. Respective upper 310 and 312 and lower 314 and 316 extensions extend from the lateral sides 302 and 304 in this embodiment. Respective apertures 318 and 320 are defined in the vertical sides 306 and 308 in this embodiment. Slots 322, 324, 326, and 328 are defined in the respective extensions 310, 312, 314, and 316. The outer bracket 288, in turn, has a plate 340 bounded by lateral sides 342 and 344. The lateral sides 342 and 344 have respective upper portions 346 and 348 and lower portions 350 and 352. The upper portion 346 has a pair of slots 354 and 356; the upper portion 348 has a pair of slots 358 and 360; and the respective lower portions 350 and 352 have slots 362 and 364. A slot 366 and an aperture 368 are defined proximate the respective lower and upper edges of the plate 340.

The inner and outer brackets 286 and 288 are assembled by aligning the slots 322 and 324 of the inner bracket 286 with the slots 354 and 358 of the outer bracket 288 and by aligning the slots 326 and 328 of the inner bracket 286 with the slots 362 and 364 of the outer bracket 288. Thusly aligned, pin 370 is extended through the slots 358, 324, 322, and 354 and pin 372 is extended through the slots 364, 328, 326, and 362. The pins 370 and 372 are secured in place by such means as snap rings 374. Alternately, the pins 370 and 372 and snap rings 374 may be replaced by such equivalent connectors as bolts, nuts, flat washers, and lock washers. Additionally, the inner and outer brackets 286 and 288 may be secured together by other connectors such as welds, rivets, or the like. The assembled inner and outer brackets 286 and 288 are attached to the plate 160 by extending bolt 376 through slot 366 and bolt 378 through aperture 368, then securing the bolts 376 and 378 with nuts 380 and washers 382. Alternatively, other connectors can be used, such as welds and rivets. The assembled panel plate connecting assembly 202 may be pivotally attached to the arm brackets 282 and 284 by extending a bolt 384 through the apertures 318 and 320 when the arm brackets 282 and 284 are in alignment therewith, then securing the bolt 384 in place by tightening a nut 386 thereon.

The height adjusting mechanism 108, in the embodiment depicted in FIG. 5, includes a bracket 400, cover 402, and connector assembly 404. The bracket 400, in turn, has a lower portion 406, vertical portion 408, and respective first and second upper portions 410 and 412. The first and second vertical members 190 and 192 extend through apertures 414 and 416, defined in respective first and second upper portions 410 and 412 and through apertures (not shown) in the lower portion 406, thereby allowing the bracket 400 and attached arm assembly 106 to be raised or lowered as desired. The first and second ends 252 and 254 of the instant arm assemblies are held in place on vertical members 190 and 192 between the lower portion 406 and the respective upper portions 410 and 412. The connector assembly 404 may include a bolt 420 and respective upper, lower, and intermediate nuts 422, 424, and 426. In the embodiment depicted, the bolt 420 extends through the orifice 224 and is rigidly fixed to the upper plate 210. A threaded portion of the bolt 420 extends through the lower portion 406 of the bracket 400. The bracket 400 is adjusted as desired by loosening the nuts 422, 424, and 426, then raising or lowering the bracket 400, then re-tightening the nuts 422, 424, and 426 to fix the bracket (and instant arm assemblies] at the desired vertical position.

Another embodiment of the instant panel wall mount is depicted in FIGS. 12-19 at 500. While not shown, a wall mount assembly, such as depicted previously at 102 and a height adjusting mechanism, such as depicted previously at 108, may be present. However, a person of ordinary skill in the art will readily recognize that other equivalent mechanisms may be present in some embodiments. The panel wall mount 500 has a singular pivoting arm assembly 506, which has a singular vertical member 510, a proximal arm member 514, and a distal arm member 516, an arm bracket 518 attached to the distal arm member 516. The vertical member 510 is generally centrally positioned, in contrast to the off-setting positioning of the vertical members 190 and 192. In the embodiment shown, the features present on the arm 512 are substantially similar to those of the first and second arms 198 and 200, described previously. However, a person of ordinary skill in the art will readily recognize that other features may be present in other embodiments. The arm bracket 518 pivotally attaches the distal arm member 516 to the panel plate connecting assembly 202 by means of the bolt 384, which is secured by a nut 386. The panel mount assembly 104 may be secured in a retracted position by a retainer 520. The retainer 520 includes prongs 522 and 524. The prongs 522 and 524 are biased so as to retain the vertical member 510 therebetween; but the vertical member 510 may be freed by exerting a force sufficient to force the prongs 522 and 524 apart.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A device for mounting an appliance to a vertical structure, the device comprising:

a horizontally adjustable wall mount assembly adapted to attach to the vertical structure;

an arm assembly pivotally attached to the wall mount assembly, the arm assembly comprising at least one arm including a proximal arm member and a distal arm member, the at least one arm including structure for retaining a wire thereto, the proximal arm member arranged so as to pivot horizontally with respect to the distal arm member;

an appliance mounting assembly pivotally mounted to the arm assembly, wherein the appliance mounting assembly comprises a first bracket portion and a second bracket portion, the first and second bracket portions operably moveably coupled with a pair of pins; and a vertical adjusting assembly for selectively adjusting the vertical position of the appliance mounting assembly relative to the wall mount assembly.

2. The device of claim 1, wherein the wall mount assembly comprises spaced apart upper and lower brackets.

3. The device of claim 1, wherein the appliance mounting assembly comprises a plate to which the appliance is attached.

4. The device of claim 1, wherein the vertical adjusting assembly comprises a fastener vertically and adjustably fixing the arm assembly with respect to the wall mount assembly.

5. A device for mounting an appliance to a vertical structure, the device comprising:

a wall mount assembly adapted to attach to the vertical structure;

an arm assembly pivotally attached to the wall mount assembly, the arm assembly comprising at least one arm including a proximal arm member and a distal arm member, the at least one arm including structure for retaining a wire thereto, the proximal arm member arranged so as to pivot horizontally with respect to the distal arm member;

an appliance mounting assembly pivotally mounted to the arm assembly, the appliance mounting assembly comprising a first bracket portion and a second bracket portion, the first and second bracket portions operably moveably coupled with a pair of pins; and a vertical adjusting assembly for selectively adjusting the vertical position of the appliance mounting assembly relative to the wall mount assembly.

6. The device of claim 5, wherein the wall mount assembly comprises spaced apart upper and lower brackets.

7. The device of claim 5, wherein the appliance mounting assembly further comprises a plate to which the appliance is attached.

8. The device of claim 5, wherein the vertical adjusting assembly comprises a fastener vertically and adjustably fixing the arm assembly with respect to the wall mount assembly.

9. The device of claim 5, wherein the wall mount assembly is horizontally adjustable.

* * * * *